Nov. 14, 1967    E. L. WRIGHT    3,352,407
CONVEYOR MEDIUM
Filed Nov. 10, 1966
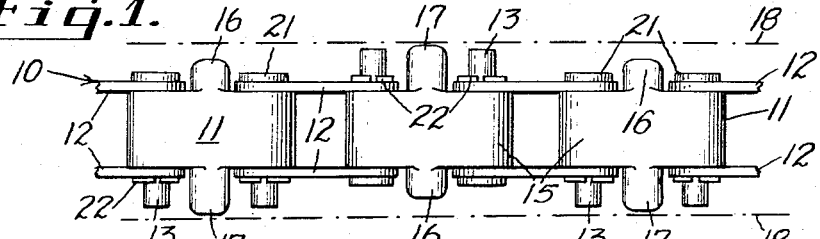
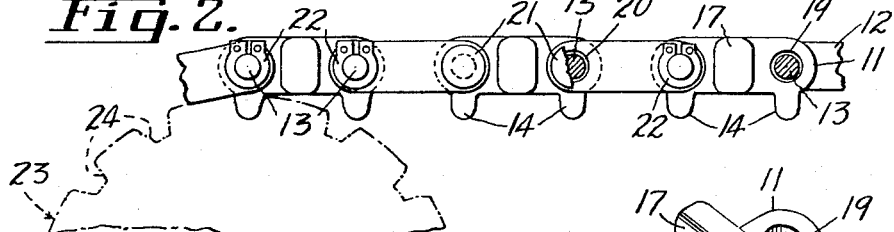
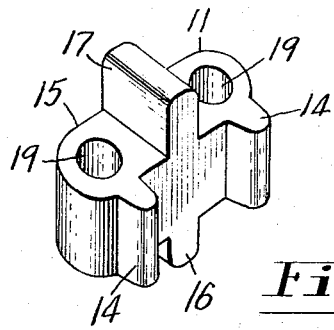
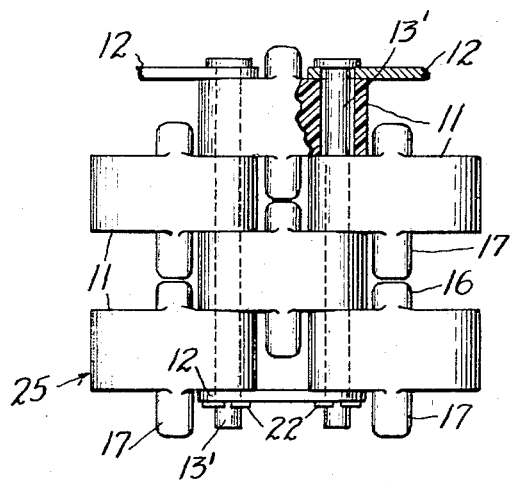
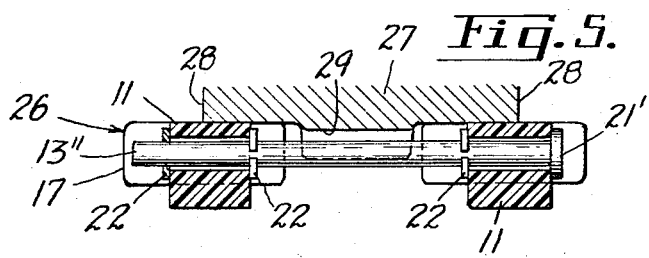
INVENTOR.
EDWARD L. WRIGHT
BY
Howard C. Thompson
ATTORNEY

United States Patent Office 3,352,407
Patented Nov. 14, 1967

3,352,407
CONVEYOR MEDIUM
Edward L. Wright, Plainfield, N.J., assignor to Custom-line Control Products, Inc., Linden, N.J., a corporation of New Jersey
Filed Nov. 10, 1966, Ser. No. 593,558
10 Claims. (Cl. 198—189)

ABSTRACT OF THE DISCLOSURE

A conveyor medium defined by single or multiple series of molded links and wherein standard plate links are employed in coupling single or multiple series of the molded links. Further, the molded links have on one surface and alined with the bores projecting teeth and sides of the molded links have centrally thereof projecting long and short members and, in alternate arrangement of the molded links in each series, the long projecting members provide guidance for the conveyor medium.

This invention relates to a conveyor medium which may be in the form of a chain or a multiple link assemblage forming a belt-like conveyor structure used in conveying articles or products from one station to another in machines and apparatus of various types and kinds. More particularly, the invention deals in a conveyor medium comprising an assemblage of molded links and standard plate-type links and preferably, wherein, alternate molded links in the conveyor medium are reversed with respect to the other links in providing on the conveyor medium and, particularly, the molded links thereof, protruding guide members for guidance of the conveyor medium between spaced stations. Still more particularly, the invention deals with a link assemblage employing coupling pins, the diameters of which are preferably smaller than diameters of bores and apertures in the molded and plate links. Further, the invention deals in a conveyor medium of the character described employing split retainer sleeves for definitely positioning molded links in spaced relation on the coupling pins in producing what might be termed a dual chain-like conveyor.

The novel features of the invention will be best understood from the following description, when taken together with the accompanying drawing, in which certain embodiments of the invention are disclosed and in which the separate parts are designated by suitable reference characters in each of the views and, in which:

FIG. 1 is a plan view showing a few coupled molded links and plate links in a conveyor medium of chain-like construction.

FIG. 2 is a side view of the structure shown in FIG. 1, with parts broken away and diagrammatically illustrating engagement with a drive pulley indicated diagrammatically, in part, in dot-dash lines.

FIG. 3 is a perspective view of one of the molded links of the conveyor medium.

FIG. 4 is a plan view of a part of a conveyor medium of the belt-like structure employing a transverse arrangement of four of the molded links in intercoupled relationship with each other, with part of the construction broken away; and FIG. 5 is a diagrammatic sectional view through spaced molded links arranged on a long pivot pin in producing what is termed a dual chain-like conveyor assemblage and indicating diagrammatically, in section, a type of product which can be moved by the conveyor.

Considering FIGS. 1 and 2 of the drawing, 10 can define a conveyor medium of a chain-like structure employing longitudinally spaced molded links 11 coupled with standard plate links 12, these links being joined by pivot or coupling pins 13.

Considering FIG. 3 of the drawing, it will appear that the molded links 11, which are molded from any suitable plastic material such, for example, as nylon or Delrin, comprise on one surface thereof projecting transverse rounded tooth members 14; whereas, the other or upper surface 15 is substantially flat. At one side of the link is a short projecting member 16 and at the other side is a longer projecting member 17 which is utilized in forming a guide member for guidance of the conveyor medium, for example, between the guides, as indicated by the dot-dash lines 18 in FIG. 1 of the drawing.

In arrangement of the links in the conveyor chain, the links have the guide members 17 disposed at opposed sides on alternate links, as will be apparent from the showing of the three links in FIG. 1. The rounded ends of the links 11 have transverse bores 19, which bores are greater in diameter than the diameter of the pins 13, as will appear at the right of FIG. 2 of the drawing. The apertures 20 of the plate links 12 are also larger in diameter than the pins 13, as illustrated in the broken-away portion of FIG. 2. This provides a freedom of movement of the links one with respect to the other and, while the variation in diameters is exaggerated in the drawing, this is by way of clarity in the illustration. The degree of freedom of movement will depend upon the installation and use of the conveyor medium.

The pins 13 have heads 21 at one end and these will be adjacent the projections 16 of the links 11; whereas, other end portions of the pins have split retainer sleeves 22 fixed thereto and these sleeves definitely position the coupled links on the pins and with respect to the heads 21. The ends of the pins preferably terminate short of the projection of the guide members 17, as will clearly appear from a consideration of FIG. 1 of the drawing.

In FIG. 2 of the drawing, at 23 is diagrammatically illustrated, in dot-dash lines, the contour of a drive wheel or pulley for driving the conveyor medium, the recesses 24 of the pulley being adapted to receive the teeth 14 of the molded links 11.

In FIG. 4 of the drawing is diagrammatically seen a transverse assemblage of four of the molded links 11 on pins 13' which differ from the pins 13 simply in their length. With this structure, the coupling pins pass through the overlapped links 11 and the assemblage is alternately joined by the plate links 12, as diagrammatically seen and this assemblage continues throughout what can be termed the belt-like conveyor medium, generally identified by the reference character 25. It will be apparent that mediums of this type and kind can be produced with various arrangements of the molded links 11, depending upon the width of the conveyor medium to be produced and which would be suitable for support of the merchandise being conveyed.

In most practical uses of the conveyor mediums, the plate links 12, as well as the pins 13, 13', will be formed of stainless steel and this can also apply to the split retainer sleeves, although other materials could be used in formation of these sleeves.

In FIG. 5 of the drawing, 26 can be said to define another modified form of conveyor medium, wherein the molded links 11 are widely spaced on the coupling and pivot pins, such as the pin 13''. In this assemblage, one of the side links is fixed adjacent the head 21' of the pin 13'' by one of the sleeves 22; whereas, two of the sleeves 22 are employed to fix the positioning of the other side link 11 adjacent the free end portion of the pin 13''. This type of a conveyor medium will provide a support for a relatively wide product, as diagrammatically shown, in section, at 27, with no support for the product intermediate the sides 28 thereof. However, with this type of structure, the product 27 could have some type of a small projection 29 centrally of the lower surface thereof which would ride freely over and in spaced relation to the pins 13″, as diagrammatically seen. Here, if the projection of the product being conveyed is more substantial, it will be understood that the structure of the links 11 can be modified to care for this added projection. With the conveyor mediums 25 and 26 shown in FIGS. 4 and 5, the same alternate arrangement of the molded links 11 will be employed so as to provide at both sides of the conveyor medium the projecting guide members 17, the same as in the showing in FIG. 1.

It will be apparent, from a consideration of FIGS. 2 and 3 of the drawing, that the projecting teeth 14 are in alinement with the axis of the bores 19 and the spacing of the apertures 20 in the plate links 12 is similar to the spacing of the bores 19 in the molded links 11 so as to maintain in the complete assemblage a common spacing of the teeth 14 for engagement with the drive wheel or pulley 23.

Conveyor mediums of the type and kind under consideration will find extensive uses in various types and kinds of machines or apparatus or associated with machines and apparatus for conveying articles or products through a machine or apparatus or in delivery thereof from one station to another. Where long conveyor mediums are employed, it will be apparent that added idler pulleys or other supports can be employed between the stations covered by the conveyor medium, particularly when the products being conveyed have such weight as will require these added supports.

Having fully described the invention, what we claim as new and desire to secure by Letters Patent is:

1. A conveyor medium comprising an arrangement of coupled molded links and plate links joined by coupling pins, each of said molded links comprising a body having projecting teeth at end portions of one surface thereof and alined with bores at end portions of said molded links, said plate links having apertures at end portions thereof, said apertures being spaced equally to the spacing of the bores in said molded links, one side of each molded link including centrally thereof a projecting member, the other side of the molded link having centrally thereof a projecting guide member, projecting a greater distance from the surface of the link than said first named projecting member, both of said projecting members extending the full vertical thickness of the body of the molded link, and means at end portions of said coupling pins for retaining the assemblage of said links against displacement from said coupling pins.

2. A conveyor medium as defined in claim 1, wherein said last named means comprises a head at one end of each coupling pin and a split retainer sleeve at the other end of each pin.

3. A conveyor medium as defined in claim 2, wherein the molded links are disposed at end portions of a long coupling pin, and other split retainer sleeves are mounted on the coupling pin in positioning molded links arranged on the pin at end portions only of the pin.

4. A conveyor medium as defined in claim 1, wherein the arrangement of the molded links in the resulting conveyor is such as to dispose the projecting guide members of said molded links alternately at opposed sides of the conveyor medium.

5. A conveyor medium as defined in claim 2, wherein said guide members of the molded links extend beyond the second named ends of said coupling pins and arranged intermediate said second named ends of the coupling pins.

6. A conveyor medium as defined in claim 5, wherein the first named projecting member of the molded links is arranged intermediate head ends of said coupling pins.

7. A conveyor medium as defined in claim 1, wherein said conveyor medium comprises an assemblage of two or more transversely arranged rows of molded links arranged on the coupling pins, the molded links of one row being in overlapped relationship to the molded links of an adjacent row, and said plate links bridging spaced molded links at sides of the conveyor medium.

8. A conveyor medium as defined in claim 1, wherein the bores of said molded links and the apertures of said plate links are greater in diameter than the diameter of said coupling pins.

9. A molded plastic link for use in forming conveying mediums incorporating molded links and plate links joined by coupling pins, said molded link comprising a body having rounded ends with transverse bores extending therethrough adapted to receive said coupling pins, one surface of the link having in alinement with said bores projecting teeth, side surfaces of the central portion of the link intermediate said bores having projecting members, the member on one side of the link projecting a greater distance than the member on the opposed side thereof to form, in the resulting conveyor medium assemblage, a guide member at opposed sides of the conveyor medium, and both of said projecting members extending the full vertical thickness of the body of the molded link.

10. A link as defined in claim 9, wherein said teeth extend the full width of the rounded ends of said molded link.

References Cited

UNITED STATES PATENTS

| 959,532 | 5/1910 | Holsman. |
| 2,358,292 | 9/1944 | Malhiot _____ 198—189 X |
| 2,654,464 | 10/1953 | Carlson _____ 198—189 |
| 2,951,578 | 9/1960 | Hibbard _____ 198—189 |
| 3,036,695 | 5/1962 | Thuerman _____ 198—189 |
| 3,209,897 | 10/1962 | Rice _____ 198—189 |

EVON C. BLUNK, *Primary Examiner.*

R. J. HICKEY, *Assistant Examiner.*